United States Patent [19]

Noworolski et al.

[11] Patent Number: 4,639,849
[45] Date of Patent: Jan. 27, 1987

[54] SNUBBER CIRCUIT FOR H.F. BRIDGE CONVERTER

[75] Inventors: Zbigniew Noworolski, Willowvale; Jerzy Ferens, Toronto, both of Canada

[73] Assignee: International Exide Electronics/Corporation, Raleigh, N.C.

[21] Appl. No.: 731,895

[22] Filed: May 8, 1985

[51] Int. Cl.$^4$ ............................................. H02H 7/122
[52] U.S. Cl. ........................................ 363/56; 363/132
[58] Field of Search ............................. 363/17, 55–56, 363/97–98, 131–132; 361/18, 56–57, 91

[56] References Cited

U.S. PATENT DOCUMENTS

| | | |
|---|---|---|
| 4,015,185 | 3/1977 | Pollmier . |
| 4,063,306 | 12/1977 | Perkins et al. ..................... 363/56 |
| 4,093,877 | 6/1978 | Pollmier . |
| 4,183,080 | 1/1980 | Liebman . |
| 4,276,588 | 6/1981 | McLyman et al. . |
| 4,334,254 | 6/1982 | Baker et al. . |
| 4,365,171 | 12/1982 | Archer . |
| 4,366,522 | 12/1982 | Baker . |
| 4,370,701 | 1/1983 | Western . |
| 4,392,172 | 7/1983 | Foley et al. . |
| 4,403,269 | 9/1983 | Carroll . |
| 4,414,479 | 11/1983 | Foley . |
| 4,432,032 | 2/1984 | Baker et al. . |
| 4,438,486 | 3/1984 | Ferraro . |
| 4,442,480 | 4/1984 | Downhower, Jr. et al. . |
| 4,446,513 | 5/1984 | Clenet . |
| 4,460,949 | 7/1984 | Steigerwald . |
| 4,477,868 | 10/1984 | Steigerwald . |
| 4,488,058 | 12/1984 | Cheffer . |
| 4,489,373 | 12/1984 | du Parc . |
| 4,502,085 | 2/1985 | Morrison et al. . |
| 4,541,041 | 9/1985 | Park et al. ....................... 363/132 |

FOREIGN PATENT DOCUMENTS 0062073  5/1981  Japan ................................ 363/56

Primary Examiner—Peter S. Wong
Attorney, Agent, or Firm—Eugene Chovanes

[57] ABSTRACT

A high-frequency converter of the bridge circuit type includes a snubber circuit connected across the output terminals of the bridge for connecting pairs of charged switching capacitors with an inductor upon the switching of the transistors of the bridge to their OFF conditions. The snubber circuit includes parallel-connected oppositely-poled additional switching devices with reverse blocking characteristic connected in series with the inductor, whereby the energy of the discharging switching capacitors is temporarily stored in the inductor in a substantially loss-free manner, and is pumped in the same direction to assist in the charging of the other capacitors.

3 Claims, 3 Drawing Figures

SNUBBER CIRCUIT FOR H.F. BRIDGE CONVERTER

STATEMENT OF THE INVENTION

This invention relates to a converter system of the high-frequency bridge type for converting direct-current power to alternating-current power supplied to a load, characterized by the provision of an improved snubber circuit for transferring power between the switching capacitors via an inductor upon TURN OFF of the switching devices, whereby energy from the switching capacitors is stored in the inductor, and the dissipation of energy is avoided.

BRIEF DESCRIPTION OF THE PRIOR ART

In switching converters, owing to imperfection of the switching devices, power is dissipated during the TURN OFF periods. This power dissipation, known as "TURN OFF losses", has a significant effect on efficiency of the converter and requires additional current-handling capability of the switching devices. To overcome this problem, snubber circuits are widely used in the art for slowing down a voltage rise on devices being switched OFF, thus reducing their TURN OFF losses.

Various types of snubber means have been proposed in the prior art as evidenced, for example, by the prior patents to Pollmeier U.S. Pat. No. 4,015,185, Carroll U.S. Pat. No. 4,403,269, Clenet U.S. Pat. No. 4,446,513, Ferraro U.S. Pat. No. 4,438,486, Steigerwald U.S. Pat. Nos. 4,460,949, and 4,477,868, and McLyman et al. U.S. Pat. No. 4,276,588, among others.

Although snubbers serve to reduce losses from switching devices, they often produce a power loss themselves, thereby limiting their application to small power or low frequency applications. When high frequency and high power is desirable, a loss in the snubbing circuits significantly reduces the power handling capacity of the converter.

In the known transistorized bridge-type converters, it is desirable to connect switching capacitors across the switching transistors. Since the capacitors are connected directly across each switching device, the voltage across them would be near zero when the adjacent device is conducting, or near supply voltage when the adjacent device is not conducting. When the control circuits force the switching devices into a non-conducting stage, the voltage across the capacitors changes faster or slower depending on the load characteristics.

With a heavy inductive load, the capacitors change their charge owing to the energy stored in the load inductance. When this occurs, the next pair of switching devices may be subsequently turned ON without the danger of dissipating energy stored across the adjacent capacitors, because the voltage across these capacitors (and thus the energy) is near zero.

With a resistive load, voltage across the capacitors rises aperiodically to reach approximately ½ of the supply voltage. The rate of this rise depends on the value of the capacitors and load resistance. When the load is very small, this process takes a relatively long time. In effect, there is still some energy stored in the capacitors prior to switching the transistors on by the control circuit. If this happens, the energy still remaining in these capacitors would be dissipated in the switching devices, thereby possibly destroying them. Numerous snubbers capable of preventing this from happening are known. There are "losses"-type snubbers which dissipate energy remaining in the capacitors or various combinations of passive components. This is sufficient for small power application, but owing to losses in their components, they are not suitable for higher power application.

The present invention was developed to provide a transistorized high frequency bridge type converter in which, to enhance the snubber's efficiency, the dissipative elements in its circuit are minimized.

SUMMARY OF THE INVENTION

Accordingly, a primary object of the present invention is to provide a transistorized bridge type converter including snubber means connected across the output terminals of the bridge circuit for controlling the discharge of the switching capacitors in relatively loss-free manner.

According to a more specific object of the invention, the snubber means includes an inductor connected at one end with one of the output terminals, the other end of the inductor being connected with the other output terminal via means including a pair of parallel-connected oppositely-poled additional switching means with reverse blocking characteristic. Control means are provided for alternately operating the additional switching means when two diagonally opposed transistors are switched to their OFF condition to initiate discharge of the switching capacitors via the inductor, thereby to temporarily store the energy of the discharging switching capacitors. In one embodiment, the additional switching means are silicon controlled rectifiers, and in another embodiment, the switching means comprise transistors connected in series with the diodes. Owing to the reverse blocking characteristic of the additional switching means, oscillation of the snubber means is prevented, and energy temporarily stored in the inductor is transferred to the other pair of switching capacitors.

The converter system of the present invention has utility in high frequency high power applications, such as an uninterrupted power supply (UPS), switch mode power supply for high power applications (above 20 KW), a static power converter (as used, for example, by welding apparatus), and as a frequency converter (a-c to a-c, d-c to d-c, or d-c to a-c) using high power semiconductors. In typical applications, the voltages may range from 100 to 1000 volts d-c, and above, with corresponding frequencies of from about 10K hz to 1K hz, respectively. The simple circuit of the present invention provides safe operation of high frequency converters without sacrificing high efficiency.

BRIEF DESCRIPTION OF THE DRAWING

Other objects and advantages of the invention will become apparent from a study of the following specification, when viewed in the light of the accompanying drawing, in which.

DETAILED DESCRIPTION

Figure 1:
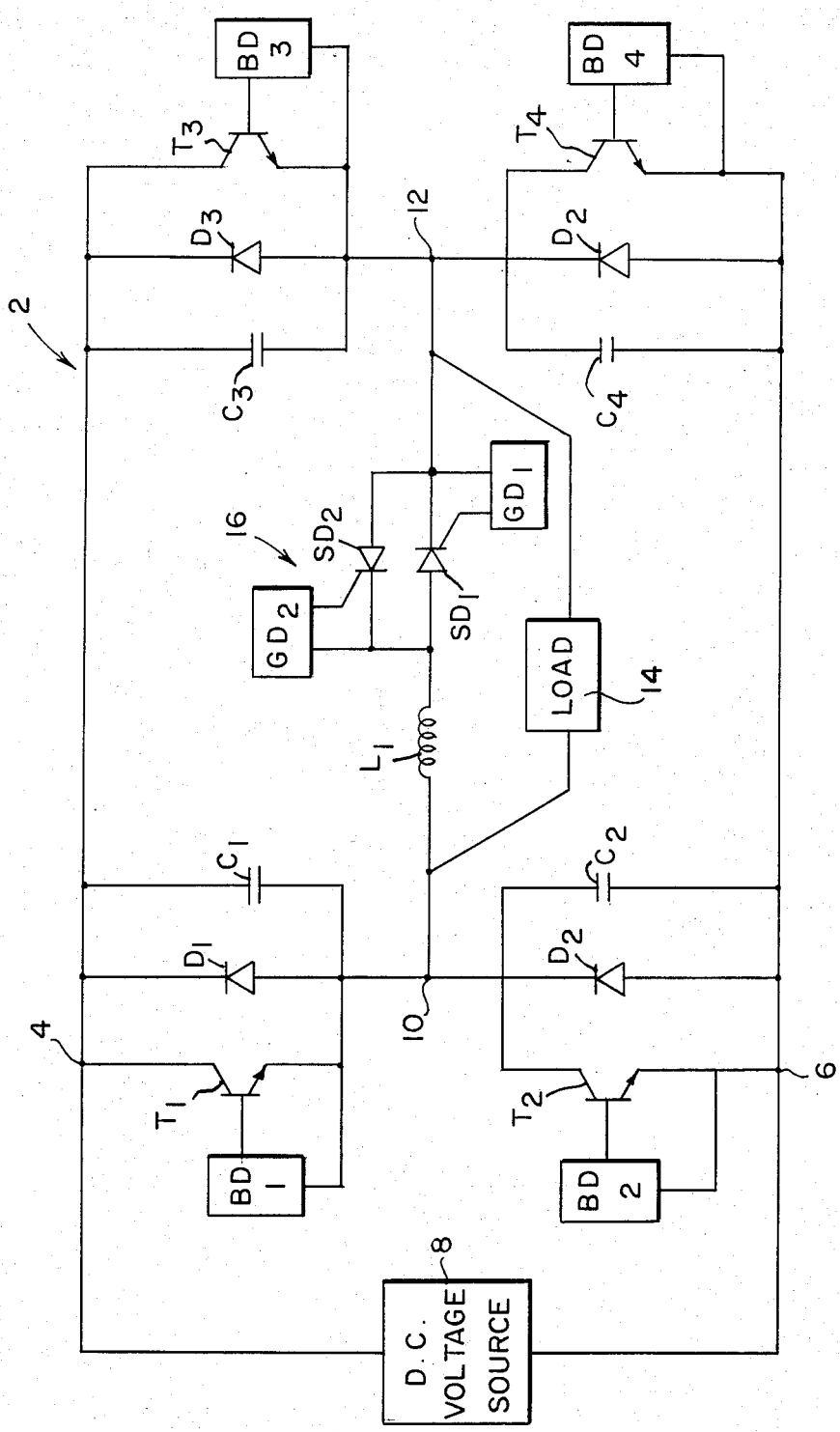
FIG. 1 is an electrical schematic diagram of the high-frequency converter system of the present invention.
Figure 3:
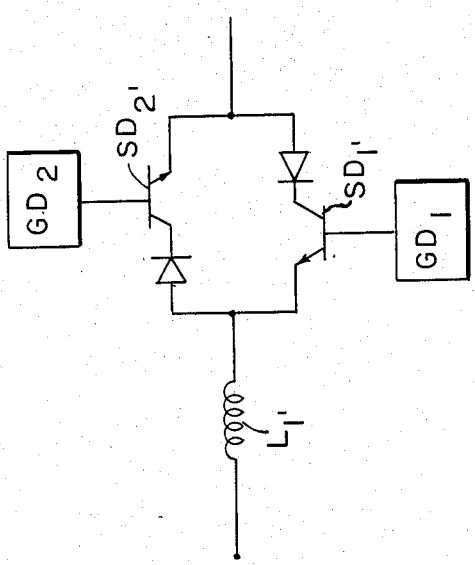
FIG. 3 is a detailed electrical schematic diagram of a modification of the snubber circuit of FIG. 1.

Referring first more particularly to FIG. 1, the converter system includes a plurality of switching transistors $T_1$, $T_2$, $T_3$, and $T_4$ the power circuit electrodes of which are connected to define a four-armed bridge circuit 2 having a pair of input terminals 4 and 6 adapted for connection across a direct-current power source 8, and a pair of output terminals 10 and 12 adapted for connection across a load 14. Connected in parallel across the transistors are blocking diodes $D_1$–$D_4$, respectively, and switching capacitors $C_1$–$C_4$, respectively. The transistors are operated by conventional control means $BD_1$–$BD_4$ connected with the control electrodes of the transistors, respectively.

In accordance with a characterizing feature of the invention, a snubber circuit 16 is connected between the output terminals 10 and 12 of the bridge circuit for controlling the discharging of the switching capacitors $C_1$–$C_4$ during the operation of the bridge circuit when the d-c supply voltage is converted to a-c output voltage developed across the load. The snubber circuit includes an inductor $L_1$ connected at one end with the output terminal 10, the other end of the inductor being connected with output terminal 12 via the parallel-connected switching devices $SD_1$, $SD_2$—namely, silicon controlled rectifiers each having a reverse blocking characteristic—, that are operable by conventional control means $GD_1$ and $GD_2$, respectively.

Figure 2:
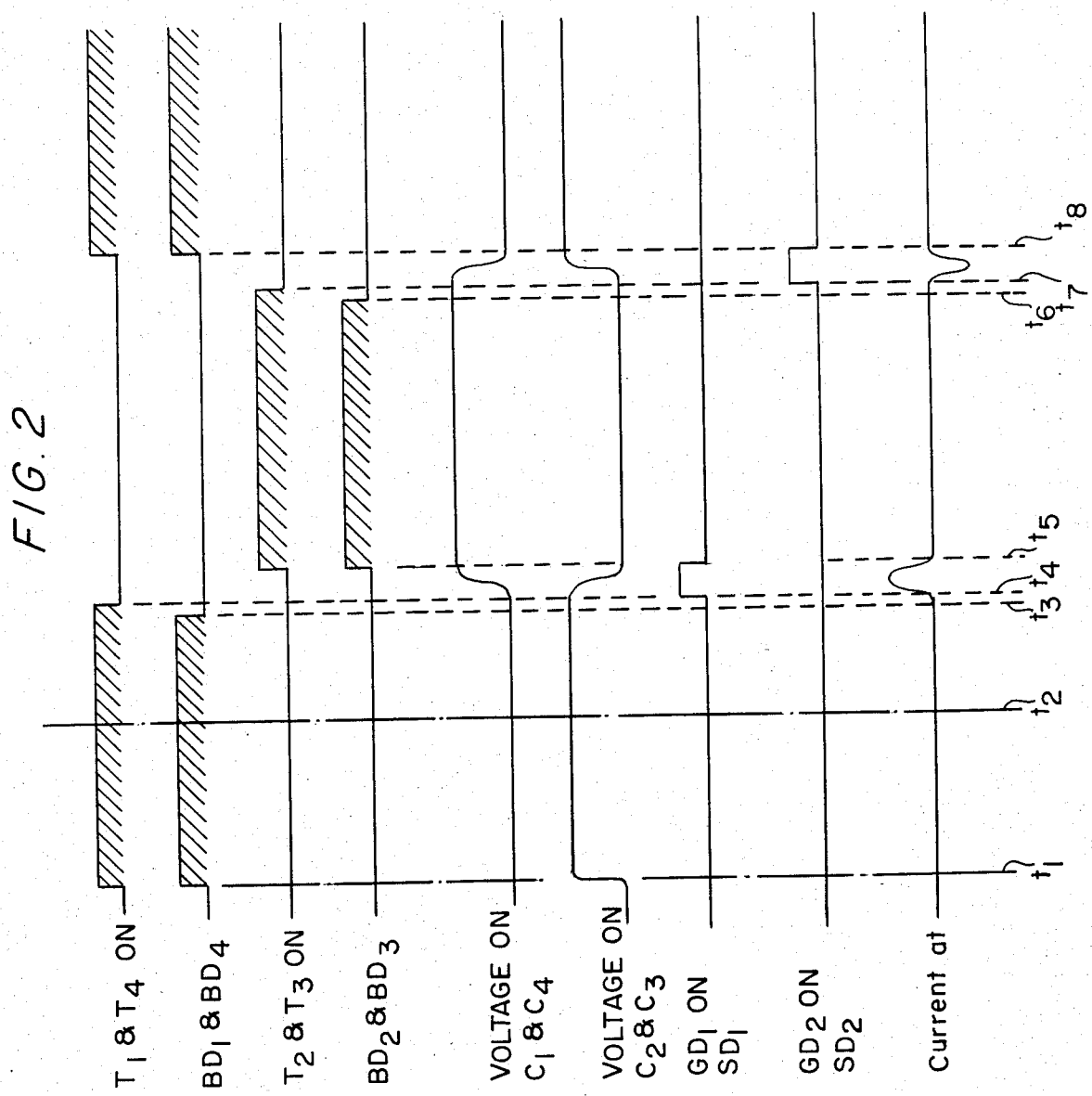
FIG. 2 is a graph illustrating the voltage and current waveforms at various locations during the operation of the converter of FIG. 1.

The operation of the converter circuit of FIG. 1 will now be described with reference to the waveform diagrams of FIG. 2. As is conventional with bridge-type transistorized converters, the transistors $T_1$–$T_4$ are driven by control means $BD_1$–$BD_4$, respectively, to form a quasi square wave across the load. Only one pair of switching transistors is turned ON or OFF at the same time—namely, the transistors contained in opposite diagonal arms of the bridge (i.e., transistors $T_1$ and $T_4$, and transistors $T_2$ and $T_3$, respectively). Thus, at time $t_1$, transistors $T_1$ and $T_4$ are turned on by the control means $BD_1$ and $BD_4$, respectively, and the voltage across the capacitors $C_2$ and $C_3$ of the other diagonal arms rises to a maximum. At time $t_3$, control means $BD_1$ and $BD_4$ are operated, thereby to cut off transistors $T_1$ and $T_4$, respectively, at time $t_4$, whereupon capacitors $C_2$ and $C_3$ start to discharge, and capacitors $C_1$ and $C_4$ start to charge. Also at time $t_4$, control device $GD_1$ operates silicon controlled rectifier $SD_1$ to permit current to flow between capacitors $C_2$ and $C_3$ via the inductor $L_1$. Since capacitors $C_2$ and $C_3$ are fully charged at this time, they start to discharge themselves through $L_1$, thereby reducing their own voltage and increasing the voltage across $C_1$ and $C_4$. Inductor $L_1$ temporarily stores the energy of the discharging capacitors, and subsequently pumps the stored energy in the same direction to assist in the charging of capacitors $C_1$ and $C_4$. This process continues until $C_1$ and $C_4$ are fully charged and $C_2$ and $C_3$ are fully discharged. Since each of the switching devices $SD_1$ and $SD_2$ has a reverse blocking capability, current cannot flow in the opposite direction, thereby preventing oscillation. The time of this process may be calculated and does not depend on the load characteristics. Presence of a heavy inductive load would, however, reduce current of the switching device $SD_1$ and $SD_2$.

Once this process of changing a charge between capacitors is completed, the control circuits $BD_2$ and $BD_3$ operate (at time $t_5$) to turn on the next pair of switching devices ($T_2$ and $T_3$). Subsequently, $SD_2$ is turned ON (at time $t_7$), thereby to connect capacitors $C_1$ and $C_4$ with inductor $L_1$ to move the charge of the capacitors back to the initial stage.

While the invention has been disclosed in connection with systems including transistors as the switching devices in the bridge arms, it is apparent that other switching devices could be used equally as well.

What is claimed is:

1. A high-frequency bridge converter circuit for converting a direct-current input voltage to a high-frequency alternating-current output voltage, comprising
   (a) a plurality of current-conducting first switching devices ($T_1$–$T_4$) each including a control electrode and a pair of power circuit electrodes;
   (b) means connecting said first switching devices to define a four-armed bridge circuit having a pair of input terminals adapted for connection across a direct-current voltage source, and a pair of output terminals adapted for connection across a load, the power circuit electrodes of first and second pairs of said first switching devices $T_1$, $T_2$, $T_3$, $T_4$) being connected in series to define first and second current paths extending in the same direction between said input terminals, respectively, said output terminals being located at the junctions between the switching devices of each pair, respectively, said bridge circuit also including
      (1) a plurality of capacitors ($C_1$–$C_4$) connected across the power circuit electrodes of said switching devices, respectively;
      (2) a plurality of blocking diodes ($D_1$–$D_4$) connected across said switching devices, respectively; and
      (3) first control means ($BD_1$–$BD_4$) for alternately switching the pairs of first switching devices contained in diagonally opposite arms ($T_1$, $T_4$; $T_2$, $T_3$) of said bridge circuit between oppositely conducting and non-conducting conditions, respectively, said first control means being operable to cause one arm to be conductive at a time ($t_5$,$t_8$) delayed from the time ($t_4$,$t_7$) at which the other arm is caused to be non-conductive, respectively, and;
   (c) snubber circuit means connected between said bridge output terminals for controlling the discharging of said capacitors during the operation of said first switching devices, respectively, said snubber circuit means including
      (1) an inductor ($L_1$) connected at one end with one of said output terminals,
      (2) means including a pair of parallel-connected oppositely-poled second switching means with reverse blocking characteristics ($SD_1$, $SD_2$) connecting the other end of said inductor with the other output terminal, and
      (3) second control means ($GD_1$, $GD_2$) for operating said second switching means to connect in series with said inductor those capacitors ($C_1$, $C_4$; $C_2$, $C_3$) that are charged when the state of conduction of the arms of said bridge circuit is reversed, respectively, said second control means being operable at the times ($t_4$, $t_7$) at which the arms are switched to their non-conductive conditions, respectively.

2. Apparatus as defined in claim 1, wherein each of said additional switching means comprises a silicon controlled rectifier.

3. Apparatus as defined in claim 1, wherein each of said additional switching means comprises a transistor connected in series with a diode.

* * * * *